(12) United States Patent
Burka et al.

(10) Patent No.: US 7,685,600 B1
(45) Date of Patent: Mar. 23, 2010

(54) SYNCHRONIZER WITH OUT-OF-LINE MONITORS FOR SHARED OBJECTS IN READ-ONLY MEMORY

(75) Inventors: Peter W. Burka, Ottawa (CA); Gianni S. Duimovich, Ottawa (CA); Angela Lin, Kanata (CA); Andrew R. Low, Stittsville (CA); Peter D. Shipton, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/341,142

(22) Filed: Dec. 22, 2008

(51) Int. Cl.
*G06F 9/46* (2006.01)
(52) U.S. Cl. .................. 718/104; 718/100; 719/316; 711/100; 711/102
(58) Field of Classification Search .............. 718/100, 718/104; 719/316; 711/100, 102
See application file for complete search history.

(56) References Cited

U.S. PATENT DOCUMENTS

| 6,237,043 | B1 |   | 5/2001 | Brown et al. |         |
|-----------|----|---|--------|--------------|---------|
| 6,754,898 | B2 | * | 6/2004 | Zhang et al. | 718/104 |
| 6,951,018 | B2 | * | 9/2005 | Long et al.  | 718/100 |

* cited by examiner

*Primary Examiner*—Andy Ho
(74) *Attorney, Agent, or Firm*—Weitzman Law Offices, LLC; Kenneth S. Weitzman

(57) ABSTRACT

A computer-implemented method for referencing a mutable out-of-line monitor for a shared object in read-only memory, comprising creating a lockword with a pointer field set to zero and a pre-set inflated bit when the object is stored in read-only memory. An out-of-line monitor table is referenced when encountering the lockword with the pointer field set to zero and the pre-set inflated bit. The desired monitor referenced in the out-of-line monitor table is identified based on the address of the lockword.

1 Claim, 3 Drawing Sheets

SYNCHRONIZER WITH OUT-OF-LINE MONITORS FOR SHARED OBJECTS IN READ-ONLY MEMORY

BACKGROUND

1. Field of the Invention

This disclosure relates generally to distributed environment synchronizers, and, more particularly, to out-of-line monitors for shared objects stored in read-only memory.

2. Description of Related Art

It is often desirable to share data structures between threads or processes in a distributed computing environment to coordinate and communicate between multiple threads or processes in execution. However, implementation of a shared object invariably requires the implementation of access control. A monitor is one data structure that satisfies this need. A monitor enables mutually exclusive access to variables within the shared object. Additionally, a monitor allows one thread or process to wait for conditions triggered by another thread or process accessing the shared object. Monitors are therefore successful data structures for implementing access control.

Monitors typically require some form of mutability to indicate and handle a "contention" event, which occurs when one computing thread or process attempts to acquire a lock on a shared object while the lock is already held by another thread or process. Monitor data is traditionally stored in the header for a shared object. This presents a challenge when the shared object is stored in read-only memory, because a read-only object will invariably have a read-only header. The common solution places the monitor data within a table, rather than in the header. In a mixed environment containing both read-only and read-write objects, this solution causes unnecessary performance degradation, because read-only and read-write objects are identical from the viewpoint of the managed runtime. A table search would be required to access the monitor of any object. The traditional solution of referencing monitor information within the object headers is far more optimal.

BRIEF SUMMARY

A computer-implemented method for referencing a mutable out-of-line monitor for a shared object in read-only memory is disclosed herein. A lockword is created with a pointer field set to zero and a pre-set inflated bit when the object is stored in read-only memory. An out-of-line monitor table is referenced when encountering the lockword with the pointer field set to zero and the pre-set inflated bit. The desired monitor referenced in the out-of-line monitor table is identified based on the address of the lockword.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

Figure 1:
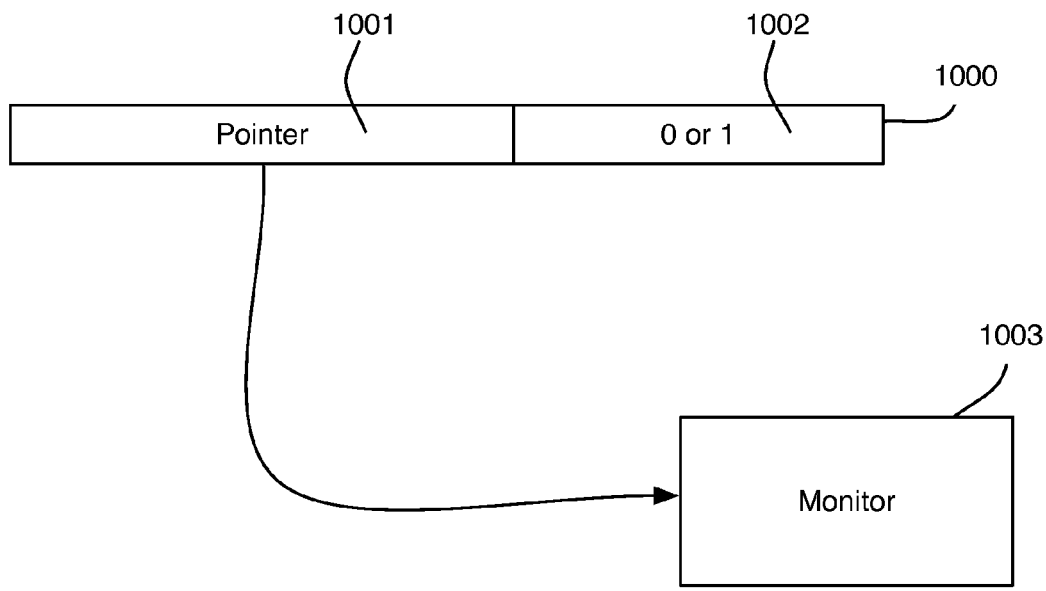
FIG. 1 is a high level representation of a distributed environment synchronizer used with monitors for shared objects stored in writable memory.

This application discloses a computer-implemented system and method for referencing a mutable out-of-line monitor for a shared object in read-only memory for use in a distributed computing environment. The disclosed embodiment retains much of the runtime efficiency gained by referencing monitor data within the header of an associated object, while retaining the security benefits of placing shared objects in read-only memory when mutability is not desired. Furthermore, although many objects may be used for locking, a large subset of these objects has a low chance of becoming locked under contention. Because the information pertaining to this set of objects may be a significant size, the disclosed embodiment enables one to safely share these objects and realize a memory savings while retaining the ability to lock in an exception case.

As will be appreciated by one skilled in the art, the present application may be embodied as a system, method or computer program product. Accordingly, the present application may take the form of an entirely hardware embodiment, an entirely software embodiment (including firmware, resident software, micro-code, etc.) or an embodiment combining software and hardware aspects that may all generally be referred to herein as a "system."

Furthermore, the present application may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including but not limited to wireless, wire line, optical fiber cable, RF, etc.

Computer program code for carrying out operations of the present application may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present application is described below with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a high-level representation of a standard distributed environment synchronizer used with standard monitors for shared objects in writable memory. The synchronizer may be implemented as a lockword 1000, which is preferably part of the header of an object (shared or unshared), and contains the monitor data (if any) for that object. Lockword 1000 contains at least pointer 1001 and bit 1002. Pointer 1001 references or "points" to the monitor (if any) associated with the shared object directly. Bit 1002 describes the "contention" state of the object, and may be set to either "0" or "1," depending on the degree of contention of a shared object. A contention is an attempt by one computing thread or process to acquire a lock while the lock is still held by another thread or process. When there is a low degree of contention, a "0" is preferably placed in bit 1002, which indicates that pointer 1001 identifies whether the shared object is locked, and which thread or process it is locked by. When there is a high degree of contention, bit 1002 is preferably set to "1," and pointer 1001 is set to reference a real monitor that controls access to the shared object. Real monitors are preferably used only when there is a high degree of contention, maximizing runtime efficiency.

When the object (and its associated header) is to be placed in read-only memory, a problem arises. Because the environment is read-only, pointer 1001 and bit 1002 are immutable and cannot be written. To preserve the functionality of the monitor (as described above), the monitor data for the shared object must be stored externally. As discussed earlier, this invariably requires additional data structures and computational steps for both read-only and read-write objects, therefore degrading the performance of the distributed runtime environment.

Figure 2:
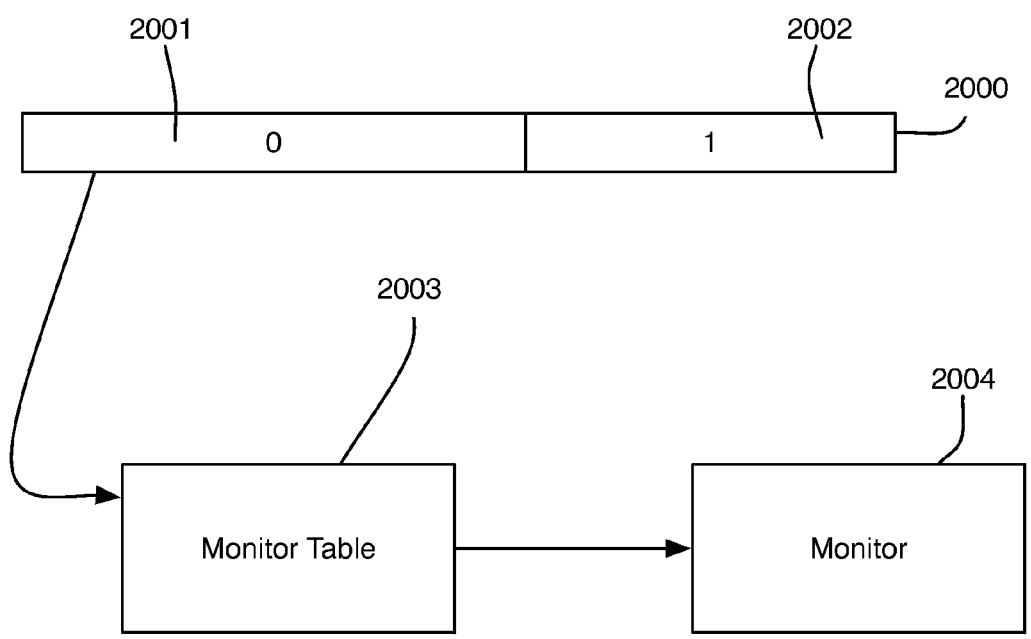
FIG. 2 is a high level representation of a distributed environment synchronizer used with out-of-line monitors for shared objects stored in read-only memory.

FIG. 2 is a high level representation of the preferred distributed environment synchronizer used with monitors for shared objects stored in read-only memory. The preferred synchronizer may be implemented as a lockword 2000, which enables in-header mutable monitors for shared objects stored in read-only memory.

Figure 3:
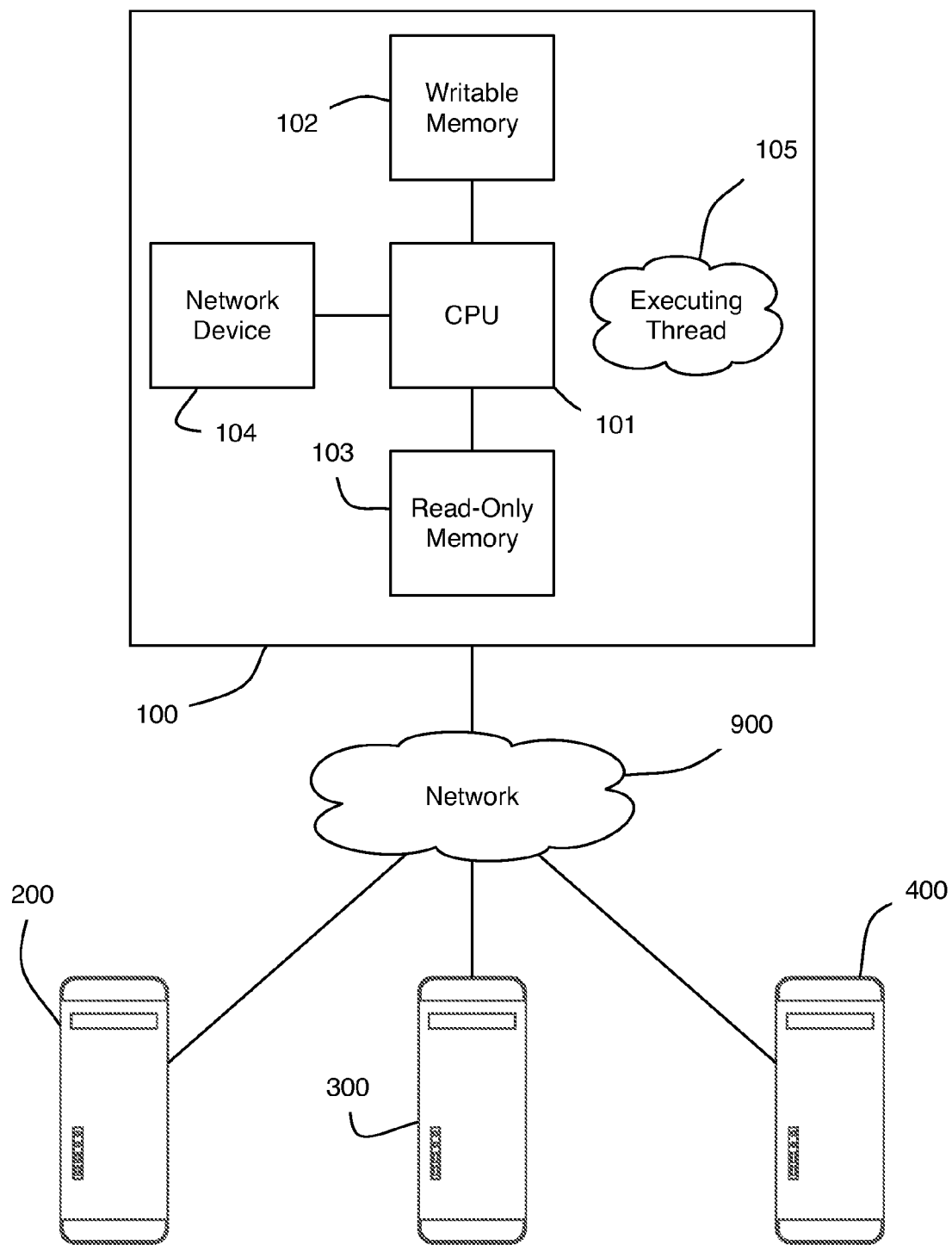
FIG. 3 is a high level representation of a distributed computing environment.

Referring to FIG. 3, lockword 2000 may be implemented on an exemplary distributed computing environment consisting of computers 100, 200, 300 and 400 on network 900. It is understood the distributing computing environment is not limited to this variation. Computer 100 may be equipped with a central processing unit (CPU) 101 for executing instructions. Computer 100 may also have memory regions, writable memory 102 and read-only memory 103 for storing information. The regions may constitute physically separate devices, partitions on a single device or abstract regions with write access defined via software programming. Network device 104 is used to communicate with other computers on network 900, which may be a local network, Internet or a corporate intranet. Computers 200, 300 and 400 may be similar in structure and operation to computer 100. Thread or process 105 is preferably a thread or process executing on computer 100.

Figure 4:
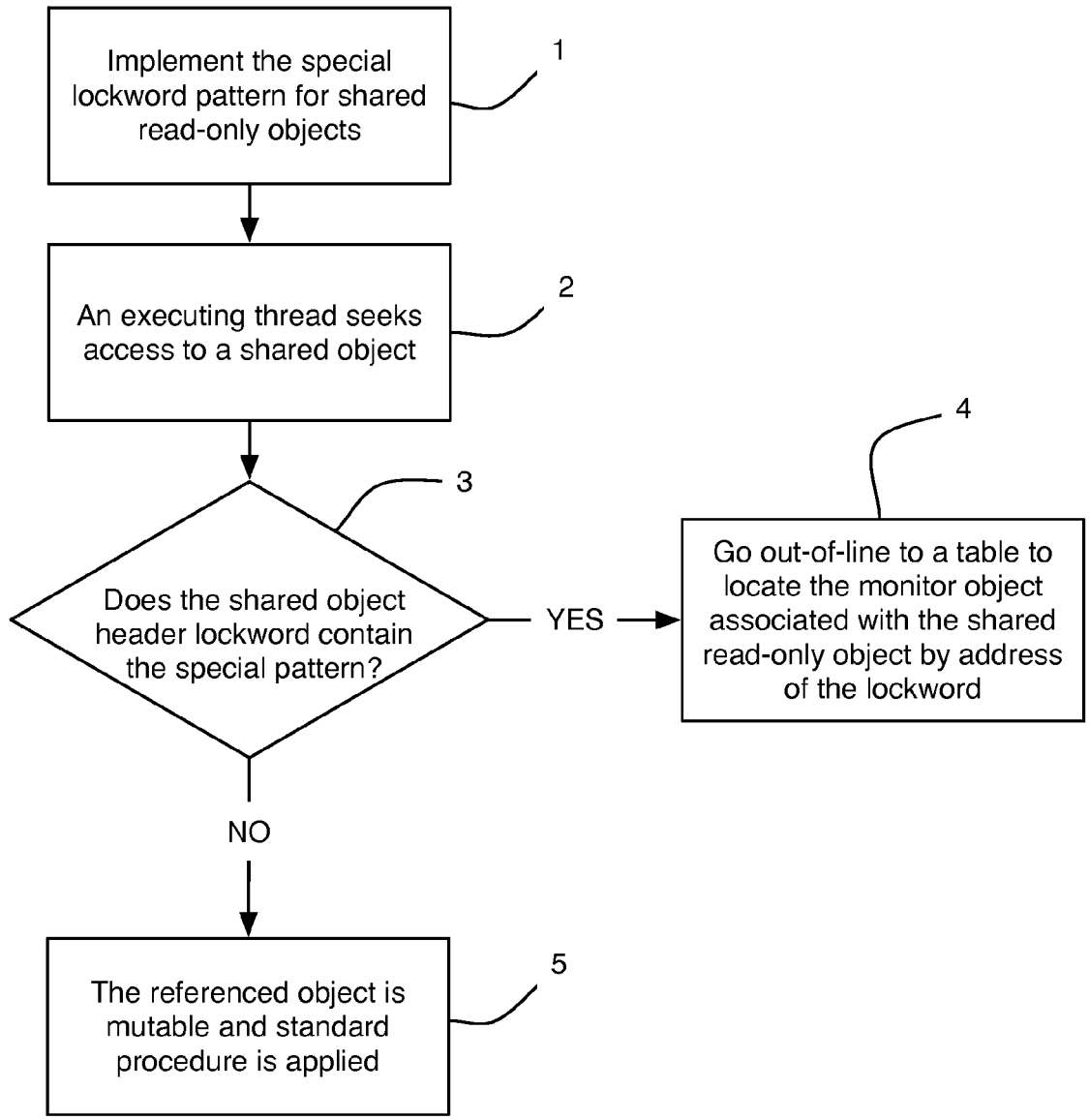
FIG. 4 is a flow diagram illustrating a preferred sequence of steps for implementing a distributed environment synchronizer used with out-of-line monitors for shared objects stored in read-only memory.

FIG. 4 is a flow diagram illustrating a preferred sequence of steps for implementing a distributed environment synchronizer used with out-of-line monitors for shared objects stored in read-only memory. In step 1, a special lockword bit pattern may be used to identify shared objects stored in read-only memory. In the preferred embodiment, the special lockword bit pattern for shared read-only objects corresponds to the overall bit pattern where the lockword pointer field 2001 is set to zero, and the pre-set inflated bit 2002 is set to "1." Lockword 2000 (and the shared object it controls) may be stored in read-only memory region 103.

In step 2, executing thread or process 105 may seek access to the shared object controlled by lockword synchronizer 2000. A check may be performed to determine whether the shared object lockword contains the special pattern. In step 3, CPU 101 is instructed to determine whether the bit pattern in lockword 2000 corresponds to the predefined special lockword bit pattern where the lockword pointer field 2001 is zero and the pre-set inflated bit is set to "1."

If the bit pattern in lockword 2000 corresponds to the special lockword bit pattern, then in step 4, the shared object associated with lockword 2000 is determined to be a shared object stored in read-only memory and executing thread or process 105 is directed to reference out-of-line monitor table 2003, which is indexed by address of the lockword 2000. Executing thread or process may then instruct CPU 101 to return the appropriate monitor 2004 associated with the address of lockword 2000 in the out-of-line monitor table 2003.

If the bit pattern in lockword 2000 does not correspond to the special lockword bit pattern, then in step 5 the object associated with lockword 2000 is determined to not be an object stored in read-only memory. Executing thread or process 105 may utilize standard procedures to interact with the object associated with lockword 2000, which must be an object in writable memory.

Having described and illustrated the principles of this application by reference to one or more preferred embodiments, it should be apparent that the preferred embodiment(s) may be modified in arraignments and detail without departing from the principles disclosed herein and that it is intended that the application be construed as including all such modifications and variations insofar as they come within the spirit and scope of the subject matter disclosed herein.

What is claimed is:

1. A computer-implemented method for referencing a mutable out-of-line monitor for a shared object in read-only memory, comprising:
    creating a lockword with a pointer field set to zero and a pre-set inflated bit set to one to reference when the shared object is stored in read-only memory;
    referencing an out-of-line monitor table when encountering the lockword with the pointer field set to zero and the pre-set inflated bit set to one; and
    identifying the mutable out-of-line monitor for the shared object referenced in the out-of-line monitor table based on an address of the lockword.

* * * * *